(12) United States Patent
Budde et al.

(10) Patent No.: US 7,334,828 B2
(45) Date of Patent: Feb. 26, 2008

(54) FORCE STRUT BRACE

(75) Inventors: Frank Budde, Damme (DE); Jochen Kruse, Osnabrück (DE); Stefan Schönhoff, Osnabrück (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/470,530

(22) PCT Filed: Nov. 12, 2002

(86) PCT No.: PCT/DE02/04197

§ 371 (c)(1),
(2), (4) Date: Jul. 28, 2003

(87) PCT Pub. No.: WO03/042023

PCT Pub. Date: May 22, 2003

(65) Prior Publication Data

US 2004/0131418 A1    Jul. 8, 2004

(30) Foreign Application Priority Data

Nov. 13, 2001   (DE)   ................... 101 55 490

(51) Int. Cl.
*B62D 27/02* (2006.01)
(52) U.S. Cl. .............. 296/29; 280/781; 411/501; 411/907; 411/908; 403/167; 403/168; 403/270; 403/282; 403/408.1
(58) Field of Classification Search ........... 403/167, 403/168, 242, 270, 279, 282, 408.1; 280/781; 296/29, 191; 441/907, 908, 501
See application file for complete search history.

(56) References Cited

U.S. PATENT DOCUMENTS

| 2,442,754 | A | * | 6/1948 | Beam .................. 29/451 |
| 2,940,558 | A | * | 6/1960 | Schlueter ............. 403/408.1 |
| 3,099,057 | A | * | 7/1963 | Cook .................... 411/501 |
| 3,330,522 | A | * | 7/1967 | Stewart ................ 411/907 |
| 3,733,655 | A | * | 5/1973 | Kolibar ................ 403/408.1 |
| 3,902,215 | A | * | 9/1975 | Waldrop et al. .......... 15/220.4 |
| 4,687,396 | A | * | 8/1987 | Berecz .................. 411/908 |
| 5,190,803 | A | * | 3/1993 | Goldbach et al. ........ 428/138 |
| 5,224,783 | A | | 7/1993 | Schmidt et al. |
| 5,720,833 | A | | 2/1998 | Grube et al. |
| 5,924,316 | A | | 7/1999 | Streubel et al. |
| 6,471,226 | B1 | | 10/2002 | Klaas |
| 6,503,585 | B1 | | 1/2003 | Wagenblast et al. |
| 2001/0050469 | A1 | | 12/2001 | Bernhardt |
| 2002/0160145 | A1 | | 10/2002 | Bauhoff |

FOREIGN PATENT DOCUMENTS

| DE | 30 04 194 | 8/1981 |
| DE | 33 32 771 | 9/1987 |

(Continued)

*Primary Examiner*—Robert J. Sandy
*Assistant Examiner*—Michael P. Ferguson
(74) *Attorney, Agent, or Firm*—McGlew and Tuttle P.C.

(57) ABSTRACT

A force connection strut (1) of a chassis of a passenger car or utility vehicle is provided for the non-positive connection between a chassis and a wheel carrier, preferably an axle strut or a chassis control arm. An elongated basic body (G) and at least two end-side mount supports (5) are provided for introducing and leading out forces.

26 Claims, 3 Drawing Sheets

FOREIGN PATENT DOCUMENTS

| | | |
|---|---|---|
| DE | 38 39 855 | 5/1990 |
| DE | 43 06 006 | 9/1994 |
| DE | 41 20 772 | 11/1994 |
| DE | 44 41 219 | 5/1996 |
| DE | 195 06 933 | 9/1996 |
| DE | 296 20 812 | 3/1997 |
| DE | 297 04 863 | 7/1997 |
| DE | 196 04 357 | 8/1997 |
| DE | 198 14 792 | 10/1999 |
| DE | 199 31 079 | 2/2000 |
| DE | 200 10 341 | 11/2000 |
| DE | 199 56 607 | 5/2001 |
| DE | 101 10 492 | 9/2002 |
| EP | 0 479 598 | 4/1992 |
| EP | 0 995 668 | 4/2000 |

* cited by examiner

FORCE STRUT BRACE

FIELD OF THE INVENTION

The present invention pertains to a force connection strut of a chassis of a motor vehicle with an elongated basic body and at least two end-side mount supports for introducing and leading out forces.

BACKGROUND OF THE INVENTION

Such chassis parts are generally known and can be used as a connection between the chassis and the wheel carrier or as an axle strut or chassis control arm. Reference is made as an example to the documents DE 41 20 772 C2, DE 33 32 771 C2 and DE 199 31 079 A1.

The above-mentioned documents pertain to force-transmitting chassis parts, which comprise essentially an elongated basic body and end-side mount supports with mounts. Even though the mount supports and mounts are made in these cases of composite materials, i.e., a combination of metals and plastic portions, the elongated basic body nevertheless always consists of metal.

It was found in the course of the development that the chassis parts, whose basic body is made mostly of forged steel or gray cast iron, do not sufficiently meet the increased requirements any longer in terms of their material properties, and the possibilities in terms of reducing the weight are also fully exhausted in the case of all-metal basic bodies.

An all-plastic basic body is sometimes also used instead of an all-metal basic body for weight optimization, but such chassis parts entail the problem that the plastics used usually tend to undergo brittle fracture. This means that the function of these chassis parts is lost 100% after damage to such a chassis part, whereas complete loss of function does not occur, e.g., in chassis parts made exclusively of metal, even though bending and deformation has occurred.

Even though composite materials based on sheet metal-plastic combinations have been known in the manufacture of automobiles from, e.g., the German unexamined patent application DE 38 39 855 A1, the applications proposed there are structural parts for motor vehicle doors, shock absorbers, structural beams, front and rear shells or door sills, in which the sheet metal parts defining the outer shape shall have increased strength or rigidity due to plastic ribbing. None of these lightweight components proposed is, however, suitable for absorbing massive compressive and tensile forces as they occur in chassis parts.

SUMMARY OF THE INVENTION

The object of the present invention is therefore to develop a force connection strut of a chassis for a passenger car or utility vehicle, which has, on the one hand, the advantage of plastic elements in terms of weight, but, on the other hand, it does not lead to an immediate total loss of its function even in case of damage.

According to the invention, a force connection strut of a chassis of a motor vehicle is equipped with an elongated basic body and at least two end-side mount supports for introducing and leading out forces. The basic body is composed of at least one element made of plastic and at least one element made of metal, and the connection between the metal elements and the plastic elements is brought about by the deformation of at least one part of the plastic elements.

It can be achieved through this design of a force connection strut that the force connection strut offers a substantial advantage in terms of weight compared with the massive all-metal struts at equal force transmission capacity, on the one hand, and, on the other hand, it prevents an immediate total loss of its function due to the use of metal elements even in case of damage to the plastic structure.

It is especially advantageous in this connection for at least one metal element to bridge over the distance between at least two mount supports and to extend preferably over at least one and preferably all mount supports.

The deformation of part of the plastic elements, which connect the plastic elements to the metal elements, may be brought about, e.g., by ultrasonic riveting or ultrasonic welding.

In the connections between a metal element and a plastic element by means of ultrasonic riveting, the plastic element may advantageously have a plastic pin, which is passed through an opening in the metal from one side, and the projection on the other side of the metal is broadened by the ultrasonic riveting such that a firm connection is established between the metal element and the plastic element.

A connection can be achieved between a metal element and a plastic element by welding, e.g., by placing the plastic element from one side on the metal element in the area of an opening in the metal element and putting on a plastic fastening element with a fastening leg and with a locking leg from the other side such that fastening leg is brought into contact with the plastic element through the opening and can be welded to same, preferably by means of ultrasound.

According to another special embodiment of the present invention, provisions are made for the basic body to be formed from at least two metal elements lying opposite each other, which are preferably flat sheet metals, which are connected to one another and are held at spaced locations from one another by a plastic element.

The metal elements may be, e.g., simple, flat, punched-out sheet metal parts or deep-drawn sheet metal parts or even so-called "tailored blanks." Especially in the case of the use of "tailored blanks," there is a very simple possibility of designing the "tailored blanks" in the areas subject to especially high loads such that a thicker material or even a special alloy with a higher strength is used there. The metal element is thus adapted to the specific load.

The basic body may have, e.g., the shape of an H or a U, and the individual legs are made partly of plastic or metal depending on the strength requirements and the geometry of the load.

Furthermore, the basic body may also comprise according to the present invention a plurality of sheet metals and plastic structures, which are arranged in a plurality of planes directed preferably in parallel and/or at right angles to one another and which are connected to one another in the above-described manner.

The basic body may have a single plastic element, which comprises at least two and preferably three of the planes, wherein the sheet metals form the rest of the planes, preferably two or three, which are preferably arranged exclusively in parallel.

In another embodiment of the basic body, the basic body may be composed, e.g., of a preferably metallic U-section and a connection element, which preferably consists of plastic and connects the free legs of the U-section at the ends.

Moreover, the invention may provide that the plastics used have at least partially fiber reinforcements, wherein the fiber reinforcements may be preferably glass fibers, carbon fibers or aramide fibers. Due to this fiber reinforcement in the plastic, it is now possible to select the percentage of the fibers such that the thermal expansion characteristic of the plastic elements at least extensively corresponds to the thermal expansion characteristic of the metal elements used, at least in the range of the usual operating temperatures of the force connection strut. As a result, stresses that could lead to damage to the force connection strut over a longer period of time because of different coefficients of thermal expansion are prevented from being generated in the composite parts. In addition, deformation of such a composite part could develop due to a different thermal expansion characteristic, or the characteristic in terms of damping or force transmission could change excessively.

Concerning the embodiment of the metal elements, the inventors propose that these be manufactured from iron or steel. If an especially lightweight construction is to be produced, the metal elements could also consist of aluminum or an aluminum alloy.

Furthermore, it is advantageous to provide the metal elements, at least if they are not manufactured from a corrosion-resistant material themselves, with a corrosion-inhibiting surface protection. Especially if the metal elements are formed by punching or deep drawing, it is especially advantageous to debur these metal elements, because the sharp burs of the metal elements may damage the plastic elements due to metal and plastic elements being placed directly on one another.

To additionally reinforce the metal elements or even for additional positive-locking connections between metal elements and plastic elements, the metal elements may also be provided with beads according to the present invention.

Furthermore, it may be advantageous for a metal element to have at least one bend in the area of the connection with a plastic element, the bend preferably engaging an opening in the plastic element connected to the metal element. In conjunction with the bends, positive-locking connections can be established between the metal elements and the plastic elements due to these openings. As a result, it is possible to produce, e.g., shapes that correspond to a bent tongue and groove construction, which leads to an additional improvement in the connection between the elements.

Finally, the inventors also propose that at least one plastic element have at least one contact surface, preferably in the form of a web or a plurality of webs, in the area of the connection with a metal element. It is achieved due to this design that the assembly of the force connection strut is facilitated, on the one hand, and a better accuracy of shape is also achieved, on the other hand, and forces that are additionally generated, especially torsional forces, can be supported.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
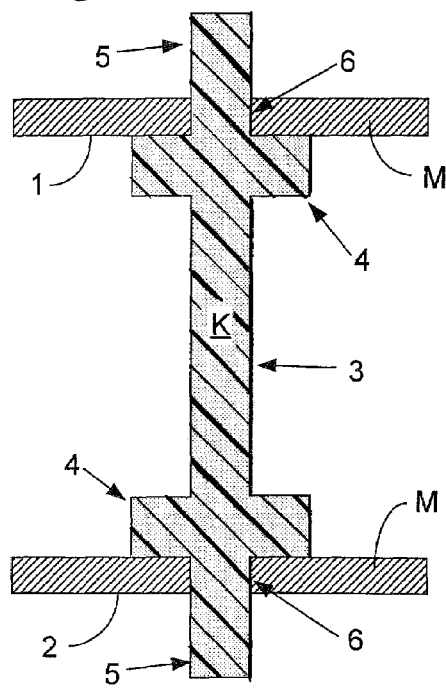
FIG. 1a is a cross sectional view showing the design of a force connection strut.
Figure 1B:
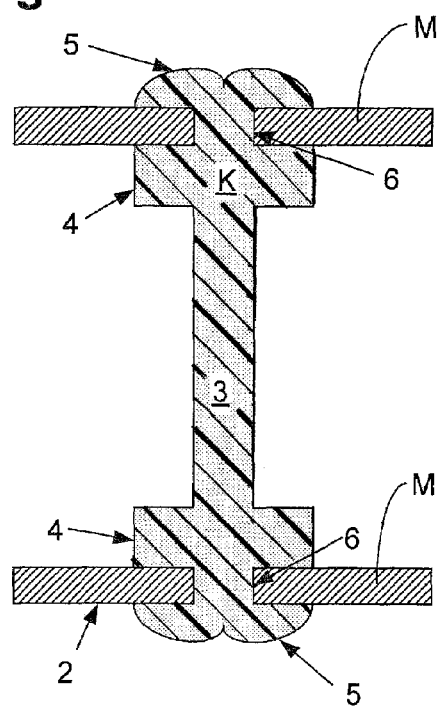
FIG. 1b is another cross sectional view showing the design of a force connection strut with ultrasonic riveting of the plastic element.

Referring to the drawings in particular, FIGS. 1a and 1b show a cross section through a force connection strut according to the present invention, comprising two flat deep-drawn sheet metals 1 and 2, which are arranged at spaced locations from and in parallel to each other. A plastic element 3, which passes through the openings 6 of the two deep-drawn sheet metals 1 and 2 with a sufficient projection with its end-side pins 5, is arranged between the two deep-drawn sheet metals 1 and 2, which have an opening 6 each located opposite each other. The plastic elements 3 additionally have a stop 4 each on both sides, which ensures the maintenance of the distance between the deep-drawn sheet metals.

FIG. 1a shows the state of the above-mentioned arrangement before the ultrasonic riveting, while FIG. 1b shows the state after the ultrasonic riveting. The pins 5 have been deformed here because of the action of the ultrasound, have broadened and form a positive-locking connection between the plastic elements 3 and the two deep-drawn sheet metals 1 and 2. In the connections being shown, the openings 6, through which the plastic elements 3 pass, may be arranged either at a plurality of points of small extension, or they may also be elongated holes, so that the ultrasonic riveting becomes effective over a longer section.

Figure 2A:
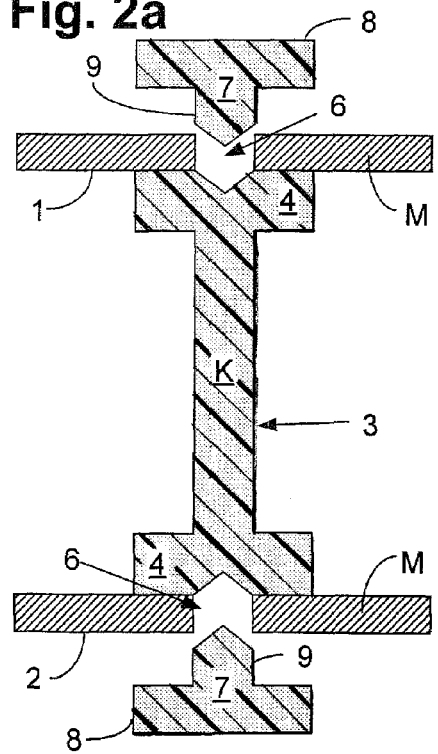
FIG. 2a is a cross sectional view showing the design of a force connection strut.
Figure 2B:
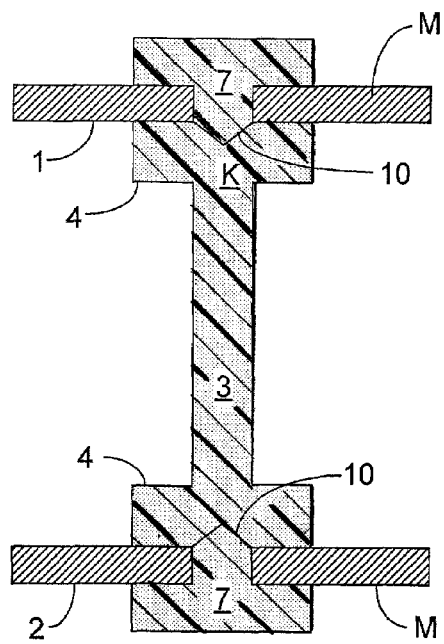
FIG. 2b is another cross sectional view showing the design of a force connection strut with ultrasonic welding of the plastic element.

FIGS. 2a and 2b show basically the same arrangement of a force connection strut according to the present invention with two deep-drawn sheet metals located opposite each other with an opening 6 each. A plastic element 3, which has, e.g., the shape of an H, is located between the sheet metals 1 and 2, so that the sheet metals 1 and 2 lie on the short legs. In addition, a V-shaped groove, which is arranged in the area of the openings 6, is located in the short leg.

FIG. 2a additionally shows, still in the separated state, two approximately T-shaped plastic fastening elements 7 with a fastening leg 9 each and with a locking leg 8 arranged at right angles thereto, which are arranged such that the fastening leg 9 extends through the opening 6 in the respective sheet metals 1 and 2 and can be brought into direct connection with the plastic element 3.

Finally, FIG. 2b shows the two plastic fastening elements 7 pushed into the openings 6 and a weld seam 10 prepared by means of ultrasonic welding between the fastening elements 7 and the plastic element 3, so that a stable fastening is obtained, on the whole, between the two sheet metal parts 1 and 2 and the plastic element 3.

All the sheet metal parts shown here may be designed according to the present invention both as deep-drawn sheet metals, as punched sheet metals or even as "tailored blanks."

In addition, it is also possible to use sheet metals that were manufactured, e.g., by means of forging processes, such as laser cutting, plasma cutting, water jet cutting or torch-cutting.

Figure 3:
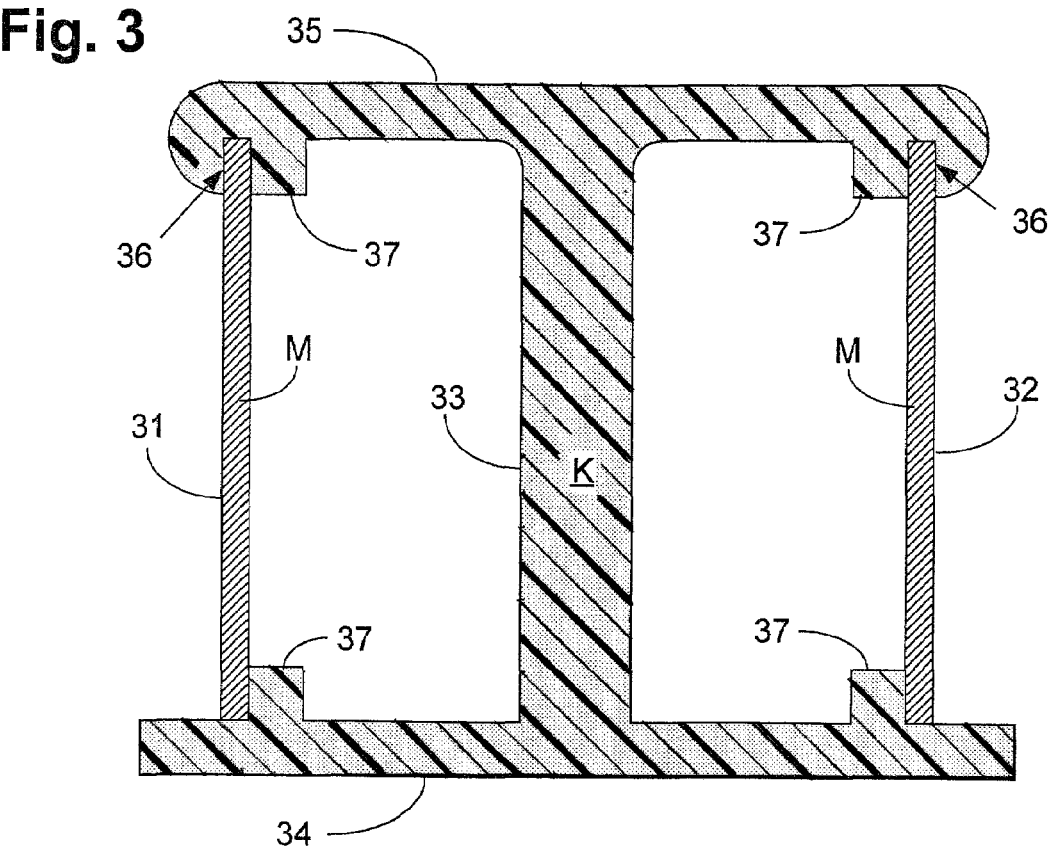
FIG. 3 is a cross sectional view showing a force connection strut with a plastic H-section and metal connection struts.

FIG. 3 shows another variant of a design of a force connection strut according to the present invention. This comprises an approximately H-shaped plastic element, which is composed of the central leg 33 and the two peripheral legs 34 and 35. The central leg 33 is arranged at right angles to the two peripheral legs 34 and 35 arranged in parallel and is rigidly connected to these. The first peripheral leg 34 has a stop 37 each on the inner side, whereas the second peripheral leg 35 has two grooves 36 extending at its edge, which are limited inwardly by two stops 37 and outwardly by a bent end of the leg itself. Two flat punched sheet metals 31 and 32, which are in contact with the stops 37 of the first peripheral leg 34 on the other side, are pushed into these grooves 36. If the projection of the first peripheral leg of the plastic H-section 34 is now adapted on both sides by applying ultrasonic or thermal deformation of the contour of the leg 35 located opposite in the edge area, very good positive-locking connection is established between the plastic and metal elements. The positive-locking connection can be additionally improved by providing openings or beads in the metal elements in the area of the deformations.

Figure 4:
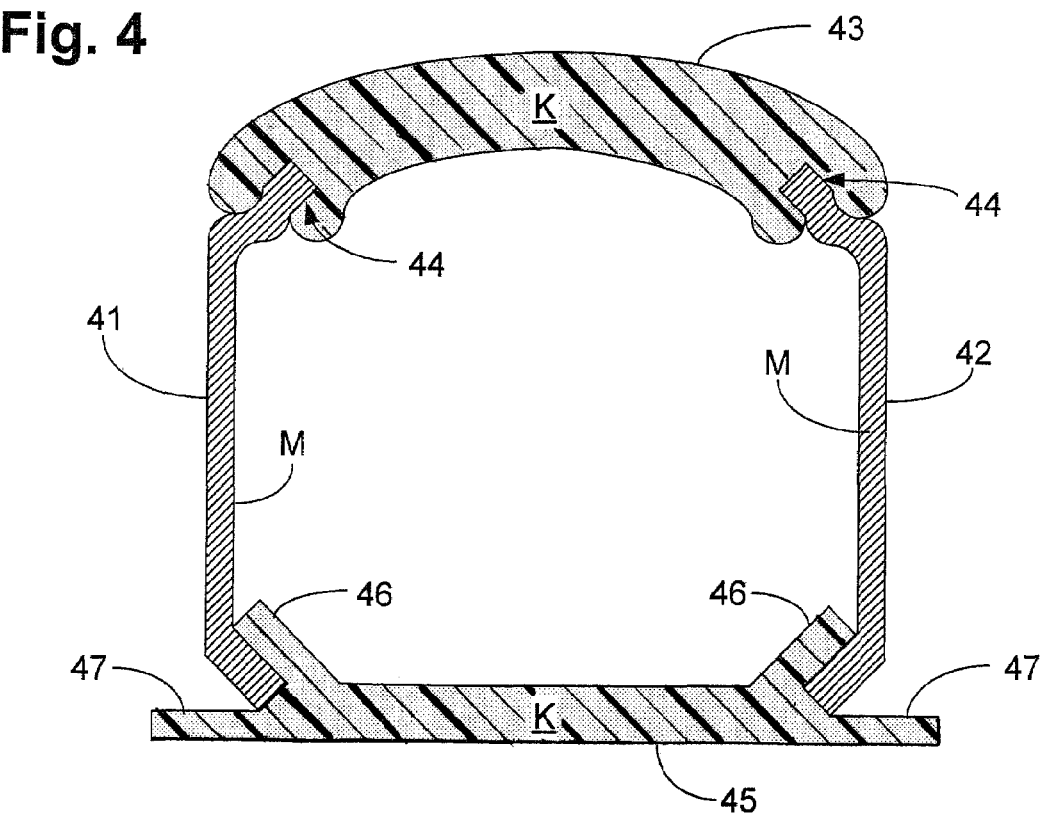
FIG. 4 is a cross sectional view showing a force connection strut designed as a U-section.

FIG. 4 shows the cross section of another embodiment of a force connection strut according to the present invention. This is composed of two deep-drawn sheet metals 41 and 42 arranged at the edge and two plastic elements 43 and 45 connecting these. The plastic section 43 lying on top has a groove 44 each at its two ends, which can be engaged by the two sheet metals with their ends bent in a rounded shape in a positive-locking manner. The plastic element 45 lying at the bottom has two straps 46 on its top side, which are arranged at an angle of about 45° in relation to the principal plane of the plastic element 45. These are directly connected to the bent ends of the sheet metals 41 and 42, e.g., by ultrasonic riveting or ultrasonic beading. In addition, the free straps 47 may also be deformed, so that an even better positive-locking connection is formed with the sheet metal parts 41 and 42. The sheet metal parts 41 and 42 may have beads and/or openings in the area of the connections in this case as well in order to achieve an optimization of the positive-locking connection between the individual parts fitted together. It may also be advantageous to provide the sheet metals with beads or other corresponding shapes, e.g., during the deep drawing, in other areas that are not in connection with other parts, so that increased torsional rigidity is achieved.

It shall also be noted that the plastic element 43 from FIG. 4 has an arched shape and is as a result able to absorb especially high radial loads.

Figure 5:
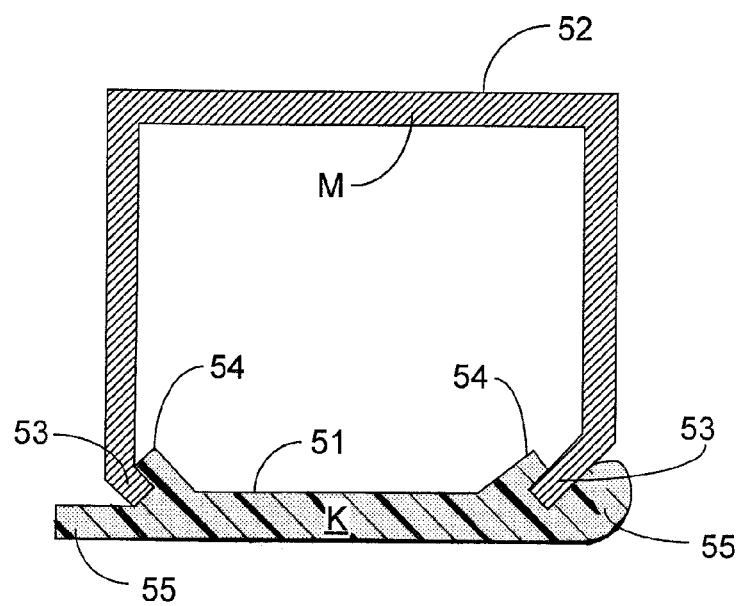
FIG. 5 is a cross sectional view through a force connection strut with a U-section made of metal and connecting plastic section of the free legs.

Finally, FIG. 5 shows a simplified form of the force connection element from FIG. 4. A metallic U-section 52 is beveled obliquely at its free ends 53 here. To close the U-section, a plastic element 51, which has a likewise bent inner strap 54 each at its ends, is attached in a positive-locking manner, and the outer strap 55 is subsequently deformed in a positive-locking manner by the action of ultrasound or heat, so that a rigid connection is established between the metallic U-section 52 and the plastic element 51. The arrangement of corresponding openings or beads in the connection area is beneficial for strengthening the connection in this case as well.

Figure 6:
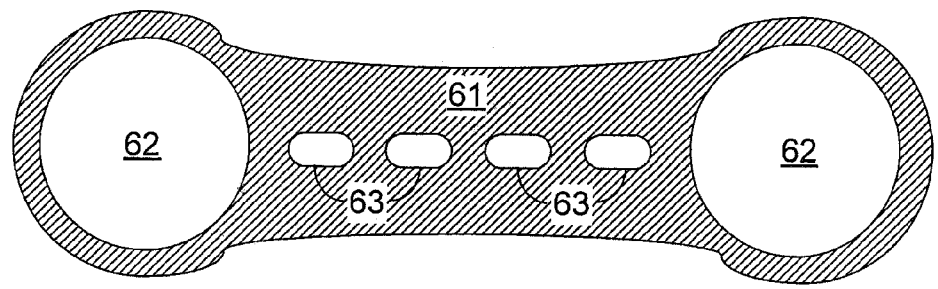
FIG. 6 is a cross sectional top view of a metallic punched part of the connection strut according to the present invention.
Figure 7:
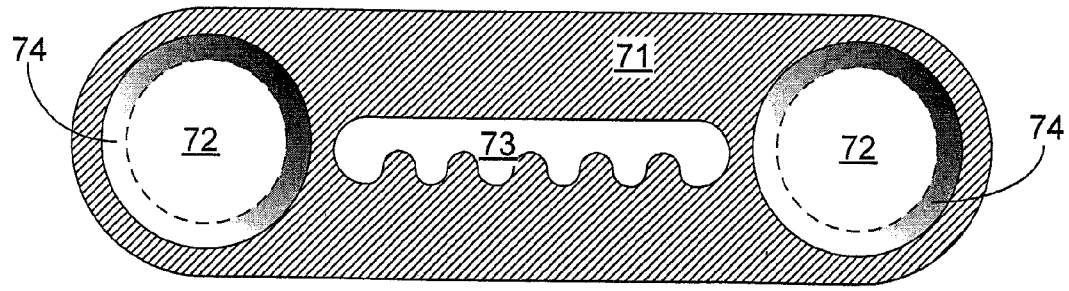
FIG. 7 is a cross sectional top view of a deep-drawn metal element of a force connection strut.

Finally, FIGS. 6 and 7 show two embodiments of the above-mentioned metal elements. FIG. 6 shows a flat punched part 61, which has an opening 62 each at both ends, into which a mount support having the shape of a sleeve is inserted, and two such punched parts, as thy are shown, e.g., in FIGS. 1a and 1b as well as FIGS. 2a and 2b, can be fitted together to form a force connection strut. The openings 63 shown are used now to connect the plastic part arranged between the metal elements with the metal element by ultrasonic riveting or ultrasonic welding.

A similar embodiment of a metal element 71 is shown in FIG. 7. This likewise has an opening 72 each on both sides, and these openings have a deep-drawn sleeve for the mount support, indicated by the circles drawn in broken lines. In addition, an elongated hole 73, which is likewise provided to establish the connection with a plastic element, is provided in this deep-drawn sheet metal between the openings 72. For example, flat lines of the wall of the elongated hole 73 are indicated on the top side, while a wavy course of the side sheet metals of the elongated hole 73 is shown on the underside. Both embodiments may be used, and the wave-shaped side wall ensures an improved positive-locking connection in the longitudinal direction, but it requires an additional effort for shaping the plastic element.

The parts made of plastic are additionally designated by K and represented by appropriate crosshatching in the figures shown above, whereas the parts consisting of metal are marked by M and are shown by oblique hatching.

Consequently, a non-positive connection is achieved, on the whole, between a chassis and a wheel carrier with the design of a force connection strut of a chassis of a motor vehicle according to the present invention. Such struts can be manufactured with a greatly reduced weight, on the one hand, and also at a very low cost because of the simplicity of the individual elements.

While specific embodiments of the invention have been shown and described in detail to illustrate the application of the principles of the invention, it will be understood that the invention may be embodied otherwise without departing from such principles.

The invention claimed is:

1. A control arm for a chassis of a motor vehicle having openings for receiving mount supports, the control arm comprising:
    a plastic connection element;
    a first planar metal control arm element comprising a flat body portion having an opening for insertion of said plastic element;
    a second planar metal control arm element separate from said first element, said second planar metal element comprising a flat body having an opening for insertion of said plastic element, said opening of said second metal element being located opposite said opening of said first metal element, said plastic element passing through said opening of said first metal element and said opening of said second metal element;
    a connection between said first planar metal element and said plastic element adjacent to said opening of said first planar metal element;
    a connection between said second planar metal element and said plastic element adjacent to said opening of said second metal element, said plastic element extending between said first planar metal element and said second planar metal element to provide a distance between said first planar metal element and said second planar metal element forming an open-sided control arm body, whereby said first planar metal element is located at a parallel spaced location from said second planar metal element, wherein each of said planar metal elements includes two additional openings at opposed ends of said control arm body for receiving said mount supports, wherein said additional openings are arranged in a plane of a respective said flat body portion with each said opening for said plastic element arranged between respective said additional openings and with each of said additional openings bordered by deep-drawn sleeves for receiving said mount supports and said metal elements are each a flat body except for the deep drawn sleeves.

2. A control arm according to claim 1, further comprising mount supports, wherein said first metal element opening is arranged between additional openings for said mount supports and said second metal element opening is arranged between additional openings for said mount supports wherein said mount supports include a first mount support formed in first additional openings of said first metal element and said second metal element and a second mount support formed in second additional openings of said first metal element and said second metal element to provide one of said mount supports on each side of said plastic element.

3. A control arm according to claim 1, wherein the control arm provides a non-positive connection between a chassis and a wheel carrier.

4. A control arm for a vehicle chassis having an opening at each end for receiving a mount support, the control arm comprising:
a plastic connection element;
a first metal control arm element having a first flat body structure, said first flat body structure having an opening for insertion of said plastic element;
a second metal control arm element separate from said first element, said second metal element having a second flat body structure having an opening for insertion of said plastic element, said opening of said second metal element being located opposite said opening of said first metal element, said plastic element passing through said opening of said first metal element and said opening of said second metal element;
a connection between said first metal element and said plastic element adjacent to said opening of said first metal element;
a connection between said second metal element and said plastic element adjacent to said opening of said second metal element, said plastic element extending between said first metal element and said second metal element to provide a parallel distance between said first metal element and said second metal element forming an open-sided control arm body, wherein each of said metal elements includes two additional openings at opposed ends of said control arm body for receiving said mount supports, wherein said additional openings for said mount supports are arranged in a plane of a respective said flat body structure and have deep-drawn sleeves extending from said plane for receiving said mount supports.

5. A control arm according to claim 4, further comprising mount supports, wherein said first metal element opening is arranged between additional openings for said mount supports and said second metal element opening is arranged between additional openings for said mount supports, wherein said mount supports include a first mount support formed in first additional openings of said first metal element and said second metal element and a second mount support formed in second additional openings of said first metal element and said second metal element to provide one of said mount supports on each side of said plastic element.

6. A control arm according to claim 4, wherein the control arm provides a non-positive connection between a chassis and a wheel carrier.

7. A control arm for a chassis of a motor vehicle including openings located at each end of the arm for receiving mount supports, the control arm comprising:
a plastic connection element;
a first metal control arm element having an opening for insertion of said plastic element, said first metal element being of a flat, planar shape;
a second metal control arm element separate from said first element and having a connection opening for insertion of said plastic element, said second metal element being of a flat, planar shape, said opening of said second metal element being located opposite said opening of said first metal element, said plastic element passing through said opening of said first metal element and said opening of said second metal element to define an elongated basic body;
a connection between said first metal element and said plastic element adjacent to said opening of said first metal element;
a connection between said second metal element and said plastic element adjacent to said opening of said second metal element, said plastic element extending between said first metal element and said second metal element to provide a parallel distance between said first metal element and said second metal element forming an elongated open-sided control arm body, whereby said first metal element is not in contact with said second metal element, wherein each of said metal elements includes two additional openings at opposed ends of said control arm body for receiving said mount supports, wherein a longitudinal axis of said two additional openings of each of said metal elements is arranged on a straight line intersecting a respective one of said connection opening of said second metal element and said connection opening of said first metal element, directed in a longitudinal direction of said elongated control arm basic body.

8. A control arm according to claim 7, further comprising mount supports, wherein said first metal element opening is arranged between additional openings for said mount supports and said second metal element opening is arranged between additional openings for said mount supports wherein said mount supports include a first mount support formed in first additional openings of said first metal element and said second metal element and a second mount support formed in second additional openings of said first metal element and said second metal element to provide one of said mount supports on each side of said plastic element.

9. A control arm according to claim 7, wherein the control arm provides a non-positive connection between a chassis and a wheel carrier.

10. A control arm for a chassis of a motor vehicle having openings for receiving mount supports, the control arm comprising:
a plastic connection element;
a first metal control arm element having an opening for insertion of said plastic element, said first metal element having a flat, planar structure;
a second metal control arm element separate from said first element and having an opening for insertion of said plastic element, said opening of said second metal element being located opposite said opening of said first metal element, said plastic element passing through said opening of said first metal element and said opening of said second metal element, said second metal element having a flat, planar structure;

a connection between said first metal element and said plastic element adjacent to said opening of said first metal element;

a connection between said second metal element and said plastic element adjacent to said opening of said second metal element, said plastic element extending between said first metal element and said second metal element to provide a parallel distance between said first metal element and said second metal element forming an open-sided control arm body, wherein each said metal element has an inner side facing the other said metal element and an outer side facing away from the other said metal element, and said plastic element includes two stops being arranged between said metal elements, said stops being spaced from one another and abut on said inner sides of said metal elements, and said plastic element being broadened on said outer sides of said metal elements such that the broadened areas of said plastic element abut on said outer sides of said metal elements, wherein said plastic element has an area between said stops, the width of said stops in a direction perpendicular to said longitudinal direction of said plastic element being greater than the between said stops in a direction perpendicular to said longitudinal direction of said plastic element, wherein each of said metal elements includes two additional openings at opposed ends of said control arm body for receiving said mount supports, wherein said additional openings are arranged in a plane of a respective said metal element with each said opening for said plastic element arranged between respective said additional openings.

11. A control arm according to claim 10, further comprising mount supports, wherein said first metal element opening is arranged between additional openings for said mount supports and said second metal element opening is arranged between additional openings for said mount supports, wherein said mount supports include a first mount support formed in first additional openings of said first metal element and said second metal element and a second mount support formed in second additional openings in of said first metal element and said second metal element to provide one of said mount supports on each side of said plastic element.

12. A control arm according to claim 10, wherein the control arm provides a non-positive connection between a chassis and a wheel carrier.

13. A control arm of a chassis of a motor vehicle having openings located at each end thereof for receiving mount supports, the control arm comprising:

a plastic connection element in the form of a solid member comprising plastic material;

a first planar sheet metal control arm element having a first sheet connection opening for insertion of said plastic element, said first planar sheet metal element comprising a flat surface region adjacent to said first sheet connection opening;

a second planar sheet metal control arm element separate from said first planar sheet metal element and having a second sheet connection opening for insertion of said plastic element, said second planar sheet metal element comprising a flat surface region adjacent to said second sheet connection opening, said second sheet opening of said second planar sheet metal element being located opposite said first sheet opening of said first planar sheet metal element, said plastic element passing through said first sheet opening and said second sheet opening;

a connection between said first planar sheet metal element and said plastic element formed by a deformation of a first solid part of said plastic element such that said first solid part of said plastic element contacts said first metal planar sheet element in a region around said first sheet opening;

a connection between said second planar sheet metal element and said plastic element formed by a deformation of a second solid part of said plastic element such that said second solid part of said plastic element contacts said second planar sheet metal element in a region around said second sheet opening, said plastic element extending between said first planar sheet metal element and said second planar sheet metal element to position said first planar sheet metal element opposite said second planar sheet metal element with said first planar sheet metal element being spaced apart from said second planar sheet metal element at a parallel distance forming an open-sided control arm body, whereby said first planar sheet metal element is not in contact with said second planar sheet metal element, wherein each of said planar sheet metal elements includes two additional openings at opposed ends of said control arm body for receiving said mount supports, wherein said additional openings are arranged in a plane of a respective said planar sheet metal element with each said sheet connection opening for said plastic element arranged between respective said additional openings.

14. A control arm in accordance with claim 13, wherein said plastic element has at least a partial fiber reinforcement including at least one of glass fibers, carbon fibers and aramide fibers.

15. A control arm in accordance with claim 14, wherein the percentages of fibers in said fiber reinforcement are selected to be such that the thermal expansion characteristic of said plastic element corresponds extensively to the thermal expansion characteristic of one of said sheet metal elements at least in the range of the operating temperatures.

16. A control arm in accordance with claim 13, wherein at least one of said sheet metal elements has a corrosion-inhibiting surface protection.

17. The control arm according to claim 13, wherein one of said first sheet connection opening and said second sheet connection opening is an elongated hole.

18. The control arm according to claim 17, wherein said elongated hole comprises a side having a flat-shaped or a straight contour and an opposite side having a wave-shaped contour.

19. The control arm according to claim 18, wherein said planar sheet metal elements are identically shaped.

20. A control arm according to claim 13, further comprising mount supports, wherein said first sheet connection opening is arranged between additional openings for said mount supports and said second sheet connection opening is arranged between additional openings for said mount supports, wherein said mount supports include a first mount support formed in first additional openings of said first planar sheet metal element and said second planar sheet metal element and a second mount support formed in second additional openings of said first planar sheet metal element and said second planar sheet metal element to provide one of said mount supports on each side of said plastic element, whereby said plastic element is not arranged within said additional openings.

21. A control arm according to claim 20, wherein said first sheet connection opening and said second sheet connection opening are elongated openings, and said additional openings for said mount supports are circular openings, wherein a longitudinal direction of each elongated opening lies within a plane of a respective sheet metal element.

22. A control arm according to claim 21, wherein said additional openings for said mount supports have deep-drawn sleeves and said first planar sheet metal element and said second planar sheet metal element are each flat bodies except for a set of deep drawn sleeves.

23. A control arm according to claim 20, wherein said additional openings for said mount supports have deep-drawn sleeves.

24. A control arm according to claim 20, wherein a longitudinal axis of each of said additional openings of a respective planar sheet metal element is arranged on a straight line, directed in a longitudinal direction of the respective said planar sheet metal element and intersecting the sheet connection opening of the respective said planar sheet metal element.

25. A control arm according to claim 20, wherein said additional openings have a circular shape.

26. A control arm according to claim 13, wherein the control arm provides a friction connection between a chassis and a wheel carrier.

* * * * *